(12) United States Patent
Hua et al.

(10) Patent No.: US 9,036,294 B1
(45) Date of Patent: May 19, 2015

(54) HARD DISC ASSEMBLY

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: He-Hua Hua, Wuhan (CN); Zhi-Yong Gao, Wuhan (CN); Zhi-Geng Zhang, Wuhan (CN); Yu-Lin Liu, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/528,667

(22) Filed: Oct. 30, 2014

(30) Foreign Application Priority Data

Mar. 24, 2014 (CN) .......................... 2014 1 0110435

(51) Int. Cl.
*G11B 33/02* (2006.01)
(52) U.S. Cl.
CPC ..................................... *G11B 33/02* (2013.01)

(58) Field of Classification Search
USPC ............................................ 360/99.13, 99.14
See application file for complete search history.

(56) References Cited

U.S. PATENT DOCUMENTS

| 4,965,691 | A | * | 10/1990 | Iftikar et al. | .................. | 360/133 |
| 5,175,657 | A | * | 12/1992 | Iftikar et al. | ............... | 360/98.01 |
| 5,214,550 | A | * | 5/1993 | Chan | .......................... | 360/99.13 |
| 5,235,481 | A | * | 8/1993 | Kamo et al. | ............... | 360/99.13 |
| 7,123,446 | B2 | * | 10/2006 | Thomas et al. | ............... | 360/133 |
| 2002/0039250 | A1 | * | 4/2002 | Bae et al. | .................. | 360/97.01 |
| 2002/0196580 | A1 | * | 12/2002 | Tsukahara et al. | ......... | 360/97.01 |
| 2003/0206367 | A1 | * | 11/2003 | Huang et al. | ............... | 360/97.01 |

* cited by examiner

*Primary Examiner* — Wayne Young
*Assistant Examiner* — Carlos E Garcia
(74) *Attorney, Agent, or Firm* — Novak Druce Connolly Bove + Quigg LLP

(57) ABSTRACT

A hard disc assembly includes a box and a hard disc body slidably mounted to the box. The box comprises a driving unit and a pivoting pole. The hard disc body comprises a disc member and a magnetic arm. A magnetic head is located on the magnetic arm and contacts the disc member. The magnetic arm is connected to the pivoting pole of the driving unit. The driving unit is configured to move the magnetic arm on the disc member. The magnetic head is configured to access data in the disc member when the disc member rotates. The magnetic head remains in contact with the disc member when the disc member stops rotating.

15 Claims, 5 Drawing Sheets

HARD DISC ASSEMBLY

CROSS-REFERENCE TO RELATED APPLICATIONS

This application claims priority to Chinese Patent Application No. 201410110435.1 filed on Mar. 24, 2014, the contents of which are incorporated by reference herein.

FIELD

The subject matter herein generally relates to a hard disc assembly.

BACKGROUND

A disk enclosure is a specialized casing designed to hold and power disk drives while providing a mechanism to allow them to communicate to one or more separate computers. Drive enclosures provide power to the drives therein and convert the data sent across their native data bus into a format usable by an external connection on the computer to which it is connected.

BRIEF DESCRIPTION OF THE DRAWINGS

Implementations of the present technology will now be described, by way of example only, with reference to the attached figures.

DETAILED DESCRIPTION

Figure 1:
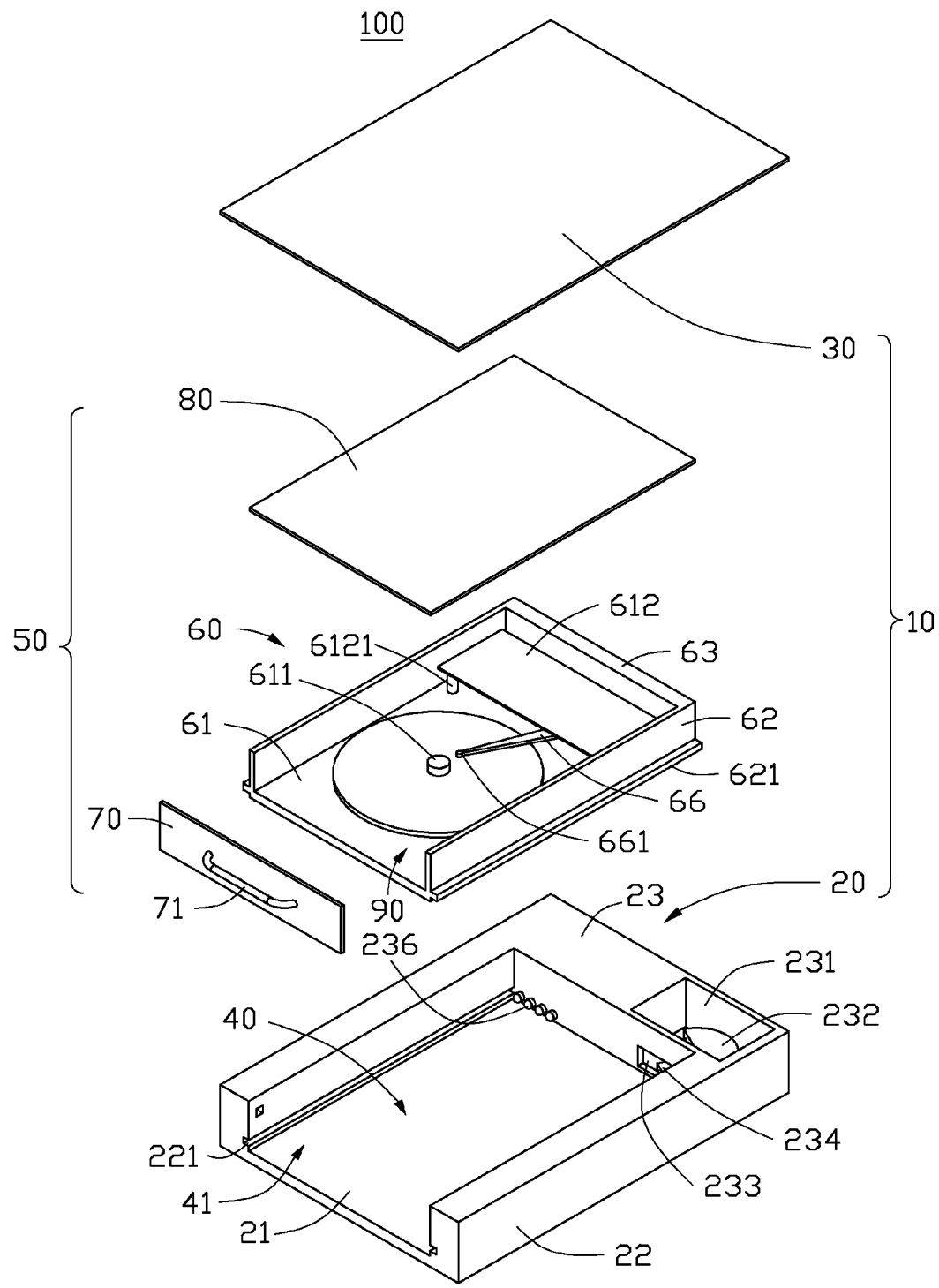
FIG. 1 is a an exploded, isometric view of an embodiment of a hard disc assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a hard disc assembly 100 in accordance with an embodiment. The hard disc assembly 100 includes a box 10 and a hard disc body 50 received in the box 10.

Figure 2:
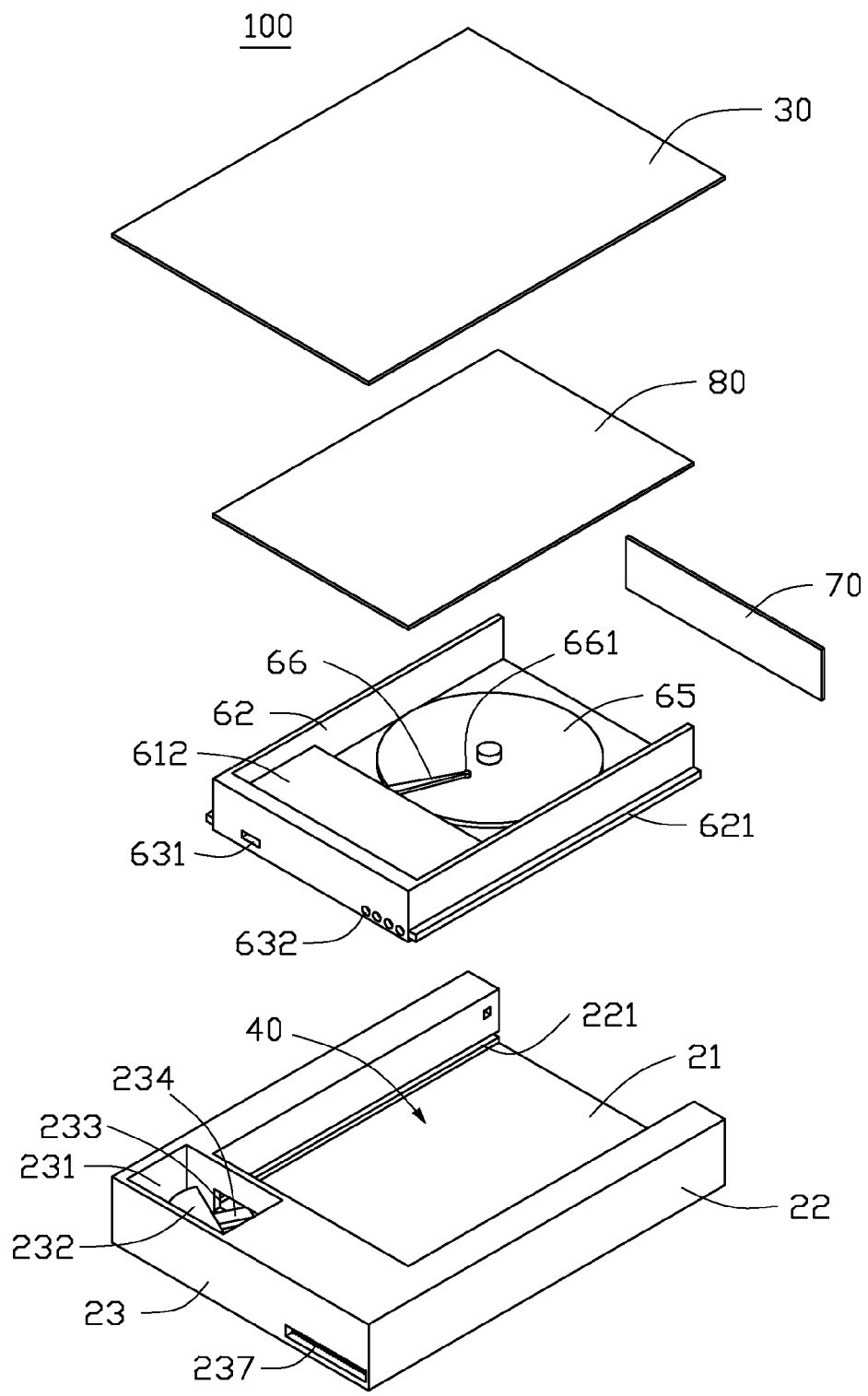
FIG. 2 is similar to FIG. 1, but viewed from another angle.

FIG. 2 illustrates the box 10 includes a first enclosure 20 and a cover 30 mounted to the first enclosure 20. The first enclosure 20 includes a first base plate 21, two first side plates 22, and a receiving board 23. The first enclosure 20 and the cover 30 corporately define a receiving space 40 for receiving the hard disc body 50. The receiving space 40 defines an opening 41 opposite to the receiving board 23. The two first side plates 22 are connected to two sides of the receiving board 23 and are substantially parallel to each other. A restricting slot 221 is defined in each of the two first side plates 22.

A receiving portion 231 is located on one side of the receiving board 23. A connecting hole 233 is defined in the receiving portion 231 in communicating with the receiving space 40. A driving unit 232 is located in the receiving portion 231. The driving unit 232 includes a pivoting pole 234. The pivoting pole 234 passes through the connecting hole 233. A converter (not shown) is located on another side of the receiving board 23. A number of connecting pins 236 are located on the converter adjacent to the receiving space 40. An extending interface 237 is located on the converter opposite to the receiving space 40.

The hard disc body 50 includes a second enclosure 60, a sliding plate 70, and a top plate 80 engaging the second enclosure 60. The second enclosure 60, the sliding plate 70, and the top plate 80 cooperatively define an accommodating space 90 therebetween. The second enclosure 60 includes a second base plate 61, two second side plates 62, and a back plate 63. A rotating axle 611 is located on the second base plate 61. A disc member 65 is rotatably mounted to the rotating axle 611. A circuit board 612 is located on the second base plate 61 adjacent to the back plate 63. A number of supporting legs 6121 are located on the second base plate 61 for supporting the circuit board 612.

A pivoting block 613 is located on the second base plate 61 below the circuit board 612. A magnetic arm 66 is rotatably mounted to the pivoting block 613. The magnetic arm 66 is connected to the pivoting pole 234. A magnetic head 661 is located on the magnetic arm 66 and contacts the disc member 65. A sliding bar 621 is located on each of the two second side plates 62 corresponding to the restricting slot 221. A through hole 631 is defined in the back plate 63 in communicating with the accommodating space 90. A number of connecting interfaces 632 are located on the back plate 63 corresponding to the number of connecting pins 236. An operating member 71 is located on the sliding plate 70.

Figure 3:
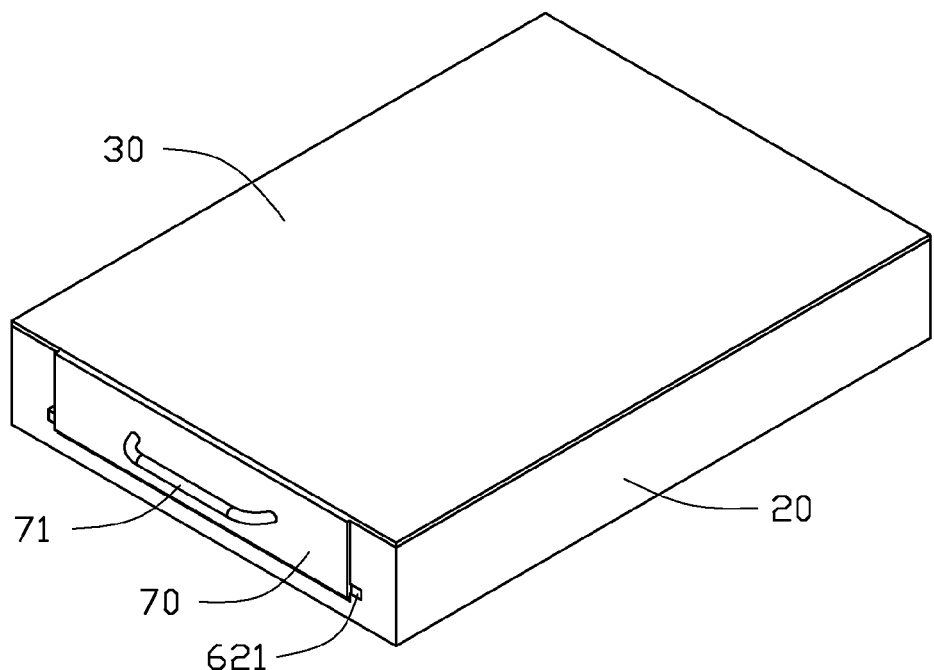
FIG. 3 is an assembled, isometric view of the hard disc assembly of FIG. 1, the hard disc assembly includes a box and a hard disc body received in the box, the box includes a cover and a top plate.
Figure 4:
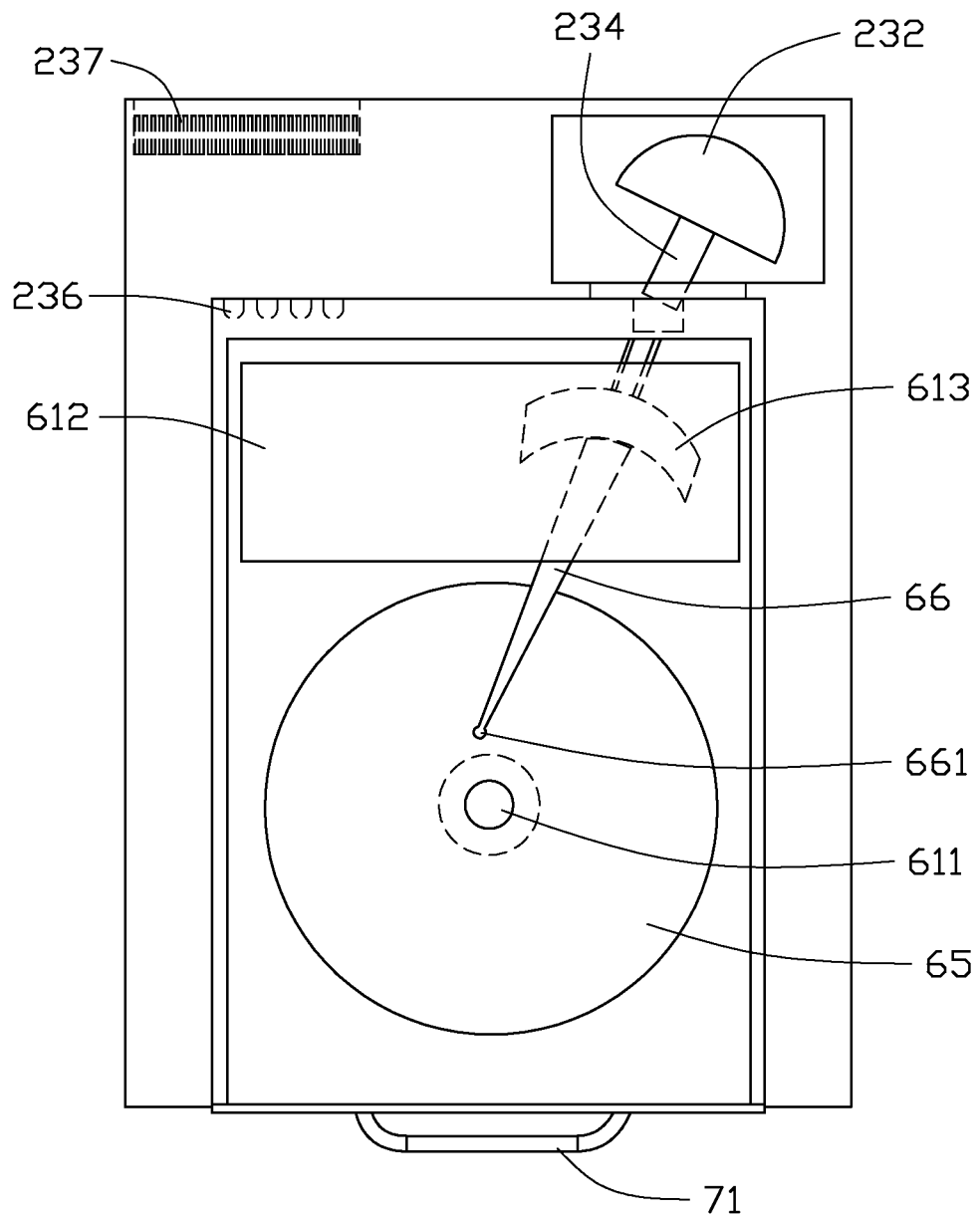
FIG. 4 is similar to FIG. 3, but viewed from another angle, omitting the cover and the top plate.

FIGS. 3 to 4 illustrate that in assembly, the cover 30 is mounted to the first enclosure 20. The assembled box 10 is located in an electronic device (not shown). The extending interface 237 is electrically coupled to the electronic device. The disc member 65 is mounted to the rotating axle 611. The magnetic arm 66 is mounted to the pivoting block 613. The magnetic head 661 is connected to the disc member 65. The number of supporting legs 6121 are located on the second base plate 61 for supporting the circuit board 612 on the second base plate 61. The sliding plate 70 and the top plate 80 are then mounted to the second enclosure 60.

FIG. 3 illustrates that in use, the back plate 63 of the hard disc body 50 is aligned to the opening 41 in the box. The sliding bar 621 is slid in the corresponding restricting slot 221. The sliding plate 70 is pushed in the receiving space 40 by the operating member 71 until the back plate 63 resists against the receiving board 23. The magnetic arm 66 is connected to the pivoting pole 234 of the driving unit 232. The number of connecting interfaces 632 are connected to the number of connecting pins 236. The hard disc body 50 is received in the box 10.

The electronic device communicates with the box 10 by the extending interface 237 when the number of connecting interfaces 632 are connected to the number of connecting pins 236. The driving unit 232 controls the magnetic arm 66 move on the disc member 65. When the disc member 65 rotates, the magnetic head 661 access data in the disc member 65; and when the disc member 65 stops rotating, the magnetic head 661 remains in contact with the disc member 65.

Figure 5:
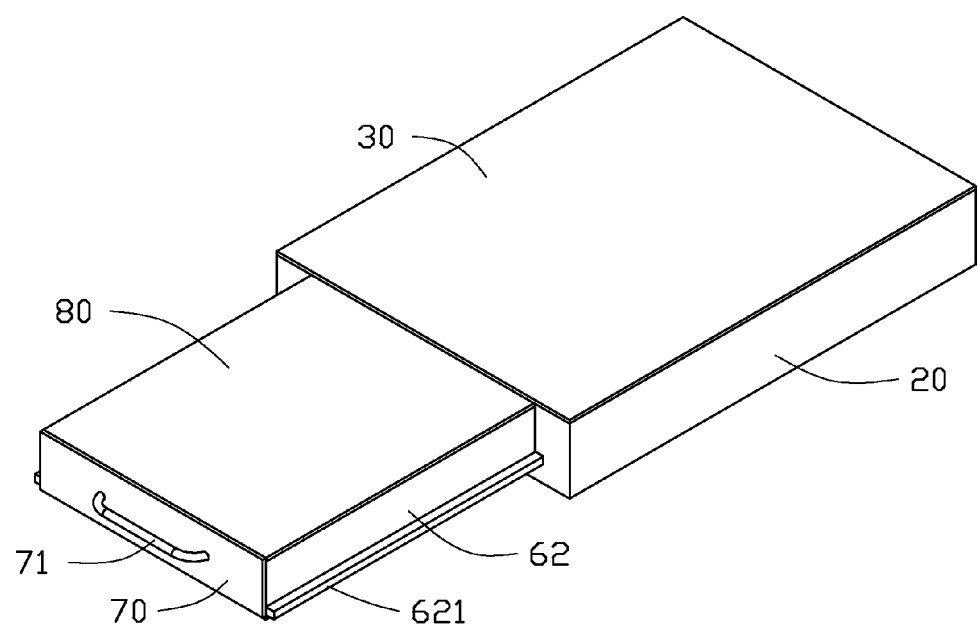
FIG. 5 is similar to FIG. 3, with the hard disc body disassembled from the box.

FIG. 5 illustrates that in use, the sliding plate 70 is pulled out of the receiving space 40 by the operating member 71 when the hard disc body 50 is disassembled from the box 10.

The embodiments shown and described above are only examples. Many details are often found in the art such as the other features of a hard disc assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A hard disc assembly comprising:
   a box comprising a driving unit and a pivoting pole; and
   a hard disc body comprising a disc member and a magnetic arm,
   wherein, a magnetic head is located on the magnetic arm and contacts the disc member;
   the hard disc body is slidably mounted to the box; and
   the magnetic arm is connected to the pivoting pole of the driving unit;
   the driving unit is configured to move the magnetic arm on the disc member; and
   the magnetic head is configured to access data in the disc member when the disc member rotates and remain in contact with the disc member when the disc member stops rotating.

2. The hard disc assembly of claim 1, wherein the box comprises a first enclosure and a cover mounted to the first enclosure; and the first enclosure and the cover cooperatively define a receiving space for receiving the hard disc body.

3. The hard disc assembly of claim 2, wherein the first enclosure comprises two first side plates which are substantially parallel to each other; a restricting slot is defined in each of the two first side plates; the hard disc body comprises a second enclosure; the second enclosure comprises two second side plates which are substantially parallel to each other; a sliding bar is located on each of the two second side plates corresponding to the restricting slot; and the sliding bar is slid in the corresponding restricting slot.

4. The hard disc assembly of claim 3, wherein the first enclosure further comprises a receiving board; a receiving portion is located on the receiving board; a connecting hole is defined in the receiving portion in communicating with the receiving space; and the pivoting pole passes through the connecting hole and connects the magnetic arm.

5. The hard disc assembly of claim 3, wherein the first enclosure further comprises a first base plate connected to the two first side plates; the second enclosure further comprises a second base plate connected to the two second side plates; a rotating axle is located on the second base plate;
   and the disc member is rotatably mounted to the rotating axle.

6. The hard disc assembly of claim 5, further comprising a circuit board located on the second base plate, and a number of supporting legs located on the second base plate for supporting the circuit board.

7. The hard disc assembly of claim 6, further comprising a pivoting block located on the second base plate below the circuit board; and the magnetic arm is rotatably mounted to the pivoting block.

8. The hard disc assembly of claim 3, further comprising a number of connecting pins located on the first enclosure adjacent to the receiving space, and a number of connecting interfaces located on the second enclosure; and the number of connecting interfaces are connected to the number of connecting pins when the hard disc body is received in the box.

9. A hard disc assembly comprising:
   a box comprising a first enclosure; and
   a hard disc body comprising a second enclosure;
   wherein, the first enclosure comprises a first base plate and two first side plates; a driving unit and a pivoting pole are located on the first base plate; a restricting slot is defined in each of the two first side plates;
   wherein, the second enclosure comprises a second base plate and two second side plates; a disc member and a magnetic arm are located on the second base plate, a sliding bar is located on each of the two second side plates corresponding to the restricting slot;
   wherein, a magnetic head is located on the magnetic arm and contacts the disc member; the sliding bar is slid in the corresponding restricting slot; the hard disc body is slidably mounted to the box; and
   the magnetic arm is connected to the pivoting pole of the driving unit;
   the driving unit is configured to move the magnetic arm on the disc member; and
   the magnetic head is configured to access data in the disc member when the disc member rotates and remain in contact with the disc member when the disc member stops rotating.

10. The hard disc assembly of claim 9, wherein the box further comprises a cover mounted to the first enclosure; and the first enclosure and the cover cooperatively define a receiving space for receiving the hard disc body.

11. The hard disc assembly of claim 10, wherein the first enclosure further comprises a receiving board; a receiving portion is located on the receiving board; a connecting hole is defined in the receiving portion in communicating with the receiving space; and the pivoting pole passes through the connecting hole and connects the magnetic arm.

12. The hard disc assembly of claim 9, further comprising a rotating axle located on the second base plate; and the disc member is rotatably mounted to the rotating axle.

13. The hard disc assembly of claim 9, further comprising a circuit board located on the second base plate; and a number of supporting legs are located on the second base plate for supporting the circuit board.

14. The hard disc assembly of claim 13, further comprising a pivoting block located on the second base plate below the circuit board; and the magnetic arm is rotatably mounted to the pivoting block.

15. The hard disc assembly of claim 10, further comprising a number of connecting pins located on the first enclosure adjacent to the receiving space, and a number of connecting interfaces located on the second enclosure; and the number of connecting interfaces are connected to the number of connecting pins when the hard disc body is received in the box.

* * * * *